United States Patent
Bae et al.

(10) Patent No.: US 8,466,923 B2
(45) Date of Patent: Jun. 18, 2013

(54) METHOD AND APPARATUS FOR CONTOLLING WRITING OF DATA TO GRAPHIC MEMORY

(75) Inventors: Jong-Kon Bae, Seoul (KR); Sang-Hoon Lim, Seongnam-si (KR); Kyu Young Chung, Seoul (KR); Won Sik Kang, Seoul (KR); Dong Hyuk Shin, Yongin-si (KR); Kyung Lip Park, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 835 days.

(21) Appl. No.: 12/476,905

(22) Filed: Jun. 2, 2009

(65) Prior Publication Data

US 2009/0309889 A1 Dec. 17, 2009

(30) Foreign Application Priority Data

Jun. 11, 2008 (KR) .................. 10-2008-0054764

(51) Int. Cl.
 *G09G 5/39* (2006.01)
(52) U.S. Cl.
 USPC .............. 345/531; 365/189.04; 365/189.05; 365/189.16
(58) Field of Classification Search
 USPC ........................................ 345/531
 See application file for complete search history.

(56) References Cited

U.S. PATENT DOCUMENTS

| | | | | |
|---|---|---|---|---|
| 5,805,504 | A * | 9/1998 | Fujita | 365/189.05 |
| 5,895,502 | A | 4/1999 | Yamamoto | |
| 8,159,440 | B2 * | 4/2012 | Furihata et al. | 345/98 |
| 2001/0001327 | A1 * | 5/2001 | Tamura et al. | 714/763 |
| 2007/0002667 | A1 * | 1/2007 | Kodaira et al. | 365/230.03 |
| 2007/0279361 | A1 | 12/2007 | Shin | |

FOREIGN PATENT DOCUMENTS

| | | |
|---|---|---|
| JP | 08-0161139 | 1/1996 |
| JP | 09-282136 | 10/1997 |
| JP | 2007-323043 | 12/2007 |
| KR | 1020070116513 | 12/2007 |

OTHER PUBLICATIONS

English Abstract for Publication No. 08-016139, Jan. 19, 1996.
English Abstract for Publication No. 09-282136, Oct. 31, 1997.
English Abstract for Publication No. 1020070116513, Dec. 10, 2007.
English Abstract for Publication No. 2007-323043, Dec. 13, 2007.

* cited by examiner

*Primary Examiner* — Ke Xiao
*Assistant Examiner* — Weiming He
(74) *Attorney, Agent, or Firm* — F. Chau & Associates, LLC (57) ABSTRACT

A method and apparatus for controlling writing of data to a graphic memory is provided. In the method and apparatus, a plurality of consecutively input data pieces are controlled to be not consecutively written to the same memory area in terms of time or space.

12 Claims, 11 Drawing Sheets

METHOD AND APPARATUS FOR CONTOLLING WRITING OF DATA TO GRAPHIC MEMORY

CROSS-REFERENCE TO RELATED APPLICATION

This application claims priority to and the benefit of Korean Patent Application No. 10-2008-0054764, filed on Jun. 11, 2008, in the Korean Intellectual Property Office, the entire content of which is incorporated by reference herein.

BACKGROUND

1. Field of the Invention

The present disclosure relates to graphic memories, and more particularly, to a method and apparatus for controlling the operation of writing data to a graphic memory.

2. Discussion of the Related Art

A liquid crystal display (LCD) driver integrated circuit (IC), which is generally used in mobile devices, drives a display operation according to a clock signal, an enable signal, and data which are asynchronously transmitted from an external host. Commands and display data received via such an asynchronous interface are written in real time to a graphic memory included in a driver IC, and are transmitted to a source driver and to a gate driver in synchronization with a regular display timing, thereby driving an LCD.

Since the demand for high-quality moving pictures has recently increased, a faster update of graphic memory with display data is needed. However, the conventional method of writing data to a graphic memory does not satisfy such a need.

Figure 1:
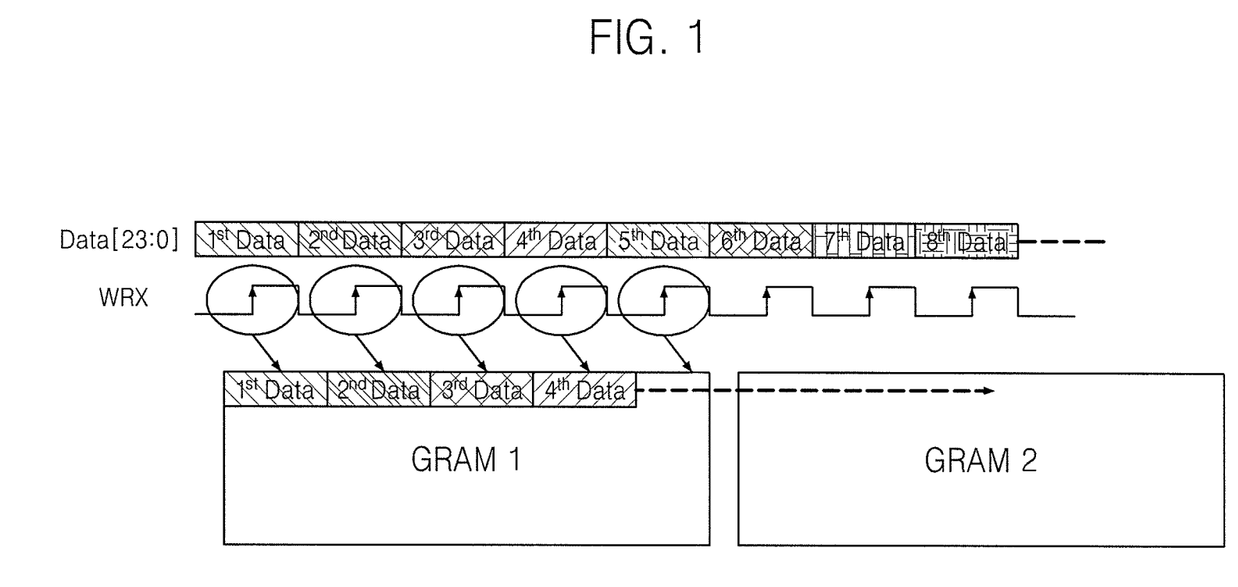
FIG. 1 is a conceptual diagram of a conventional method of writing data to a graphic memory.

FIG. 1 is a conceptual diagram of a conventional method of writing data to a graphic memory, that is, accessing the graphic memory. In the conventional graphic memory accessing method, data[23:0] is a string of data pieces sequentially written to a predetermined space of the graphic memory (GRAM) in synchronization with a data input clock signal WRX. However, even with the demand for an increase in the speed at which data is written to graphic memory, the conventional method of FIG. 1 has a limit as to increasing the data writing speed because of the minimum write cycle time of the graphic memory.

In other words, in the conventional method of writing data to a graphic memory, data pieces of adjacent pixels are sequentially written to adjacent storage areas of the same graphic memory, so that data writing cannot be faster than the write cycle speed of the graphic memory itself. For example, when the speed at which 1-bit data is input is 500 Mbps, the actual data writing speed does not exceed about 20 MHz although a data writing speed of 62.5 MHz is required. In recent years, since a driver IC having a graphic memory is included even in products of quarter video graphic array (QVGA) standard or higher, for example, wide quarter video graphic array (WQVGA), half video graphic array (HVGA), or video graphic array (VGA), an increase in an operating speed of a graphic memory is needed.

SUMMARY

In accordance with exemplary embodiments of the present invention a method and apparatus are provided for increasing the speed at which data is written to a graphic memory. Exemplary embodiments provide a method and apparatus for controlling the operation of writing data to a graphic memory, and more particularly, to a method and apparatus for controlling the operation of writing data to a graphic memory, by which data is efficiently written to the graphic memory, leading to an increase in access time, that is, a write/read bandwidth.

According to an exemplary embodiment of the present invention, a method of controlling an operation of writing data to a graphic memory having a first memory area separated from a second memory area is provided. First input data is latched in response to a first clock signal. The first input data is written to the first memory area in response to a second clock signal while simultaneously writing second input data received after the first input data to the second memory area.

The cycle of the first clock signal may be the same as or shorter than a cycle of the second clock signal.

The first input data may be odd-numberth input data and the second input data is even-numberth input data.

The method may further include: apportioning the first memory area into a first memory upper subblock and a first memory lower subblock, and the second memory area into an second memory upper subblock and a second memory lower subblock; writing first row data to a first row of the first memory upper subblock and to a first row of the second memory upper subblock; writing second row data to a first row of the first memory lower subblock and to a first row of the second memory lower subblock; writing third row data to a second row of the first memory upper subblock and to a second row of the second memory upper subblock; and writing fourth row data to a second row of the first memory lower subblock and to a second row of the second memory lower subblock.

Each row data may be odd-numberth input data and even-numberth input data, the odd-numberth input data being written to the first memory upper subblock and to the second memory lower subblock, the even-numberth input data being written to the first memory lower subblock and to the second memory upper subblock.

Each of the row data may include quarter video graphic array standard image data.

The method may further include: apportioning the first memory area into a first memory upper subblock and a first memory lower subblock, and the second memory area into an second memory upper subblock and a second memory lower subblock; writing first column data to a first column of the first memory upper subblock and to a first column of the second memory lower subblock; writing second column data are written to a first column of the first memory lower subblock and to a first column of the second memory upper subblock;
writing third column data to a second column of the first memory upper subblock and to a second column of the second memory lower subblock; and writing fourth column data to a second column of the first memory lower subblock and to a second column of the second memory upper subblock.

Each column data may be odd-numberth input data and even-numberth input data, the odd-numberth input data being written to the first memory upper subblock and to the second memory upper subblock, the even-numberth input data being written to the first memory lower subblock and to the second memory lower subblock.

Each of the column data may include quarter video graphic array standard image data.

According to an exemplary embodiment of the present invention a method of controlling an operation of writing data to a graphic memory having a first memory area separated from a second memory area is provided. First input data is written to the first memory area. Second input data is stored in a buffer memory of the graphic memory, wherein the second input data is received after the first input data. The second input data stored in the buffer memory is written to the first memory area when third input data that is received after the second input data is written to the second memory area.

The storing of the second input data to the buffer memory may include latching the second input data.

The first input data may be odd-numberth input data that is written to the first memory area, the second input data may be even-numberth input data that is written to the first memory area, and the third input data may be odd-numberth input data that is written to the second memory area.

According to an exemplary embodiment of the present invention a method of controlling an operation of writing data to a graphic memory having a first memory area separated from a second memory area is provided. First input data is written to the first memory area in response to a first clock signal second input data received after the first input data is written to the second memory area in response to a second clock signal.

According to an exemplary embodiment of the present invention an apparatus for controlling an operation of writing data to a graphic memory that has a plurality of memory areas separate from each other is provided. A controller controls a plurality of consecutive input data such that each data input of the consecutive data is not consecutively written to the same memory area in terms of time or space.

The apparatus may further include a latch unit that latches at least one of the plurality of consecutive input data.

The controller may control the data latched by the latch unit and another data from the plurality of consecutively input data to be simultaneously written to the separate memory areas, respectively.

The apparatus may further include a buffer memory that temporarily stores at least one of the plurality of consecutive input data.

The controller may control the data temporarily stored in the buffer memory and another data from the plurality of consecutively input data to be simultaneously written to the separate memory areas, respectively.

The controller may be disposed between the separate memory areas.

BRIEF DESCRIPTION OF THE DRAWINGS

Hereinbelow, exemplary embodiments of the present invention will be described in detail with reference to the attached drawings in which.

DETAILED DESCRIPTION OF THE EXEMPLARY EMBODIMENTS

In the data writing controlling method according to an exemplary embodiment of the present invention, first, received data is latched, and then subsequently received data and the latched data are respectively written to separate memory areas of the graphic memory at the same time.

Figure 2A:
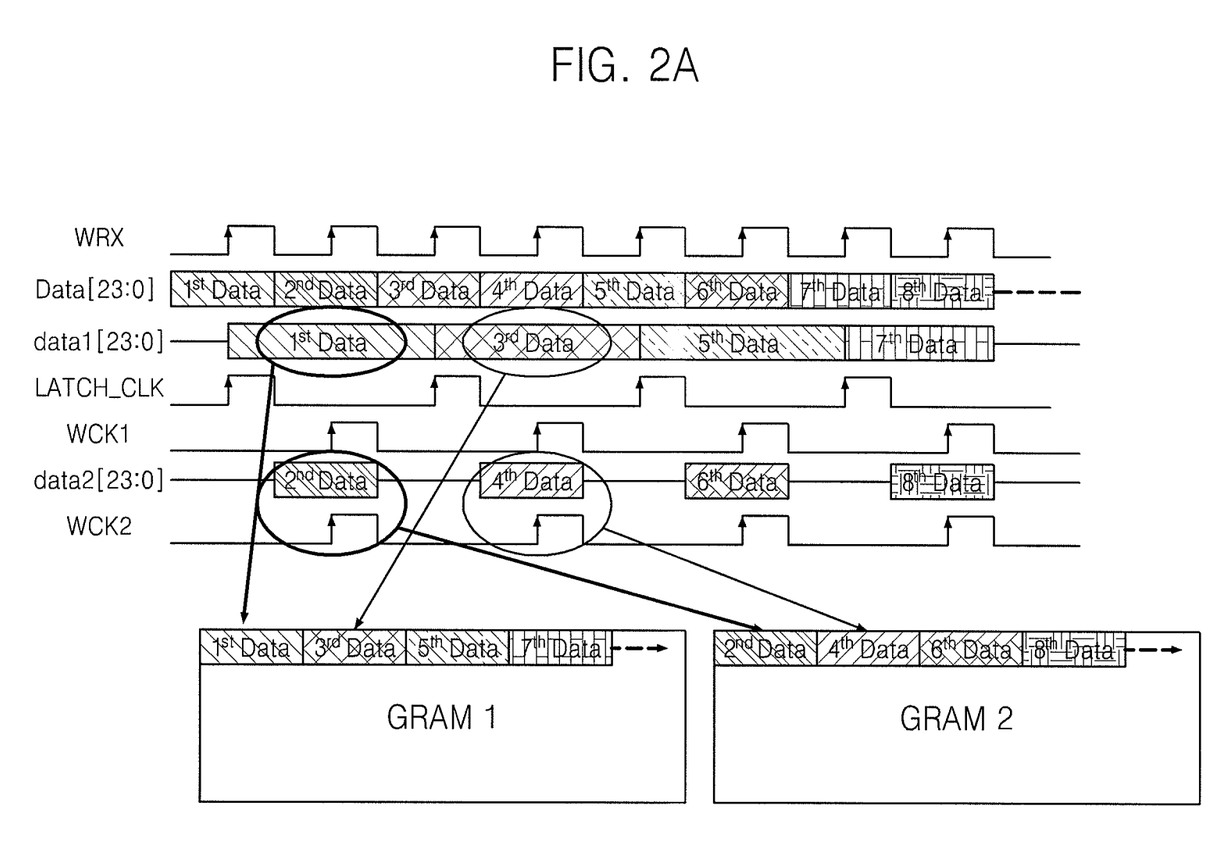
FIG. 2A illustrates a method of controlling the operation of writing data to a graphic memory according to an exemplary embodiment of the present invention.
Figure 2B:
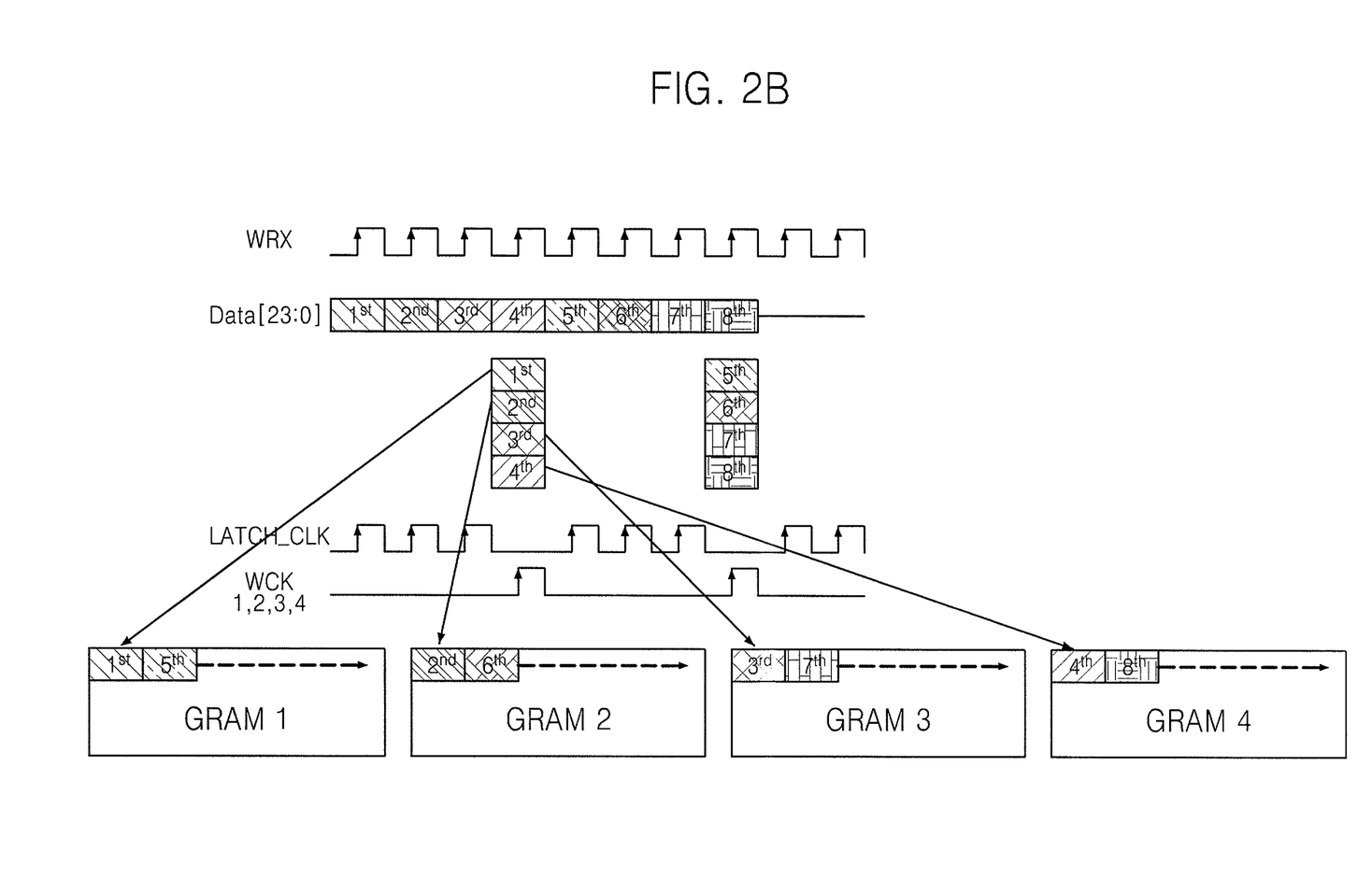
FIG. 2B illustrates a method of controlling the operation of writing data to a graphic memory according to an exemplary embodiment of the present invention.

FIG. 2A illustrates an exemplary embodiment in which a graphic memory included in a driver integrated circuit (IC) includes two separate memory areas GRAM1, GRAM2. FIG. 2B illustrates an exemplary embodiment in which the graphic memory includes four separate memory areas GRAM1, GRAM2, GRAM3, GRAM4. The driver IC may include more than four separate memory areas if needed to achieve an optimal memory configuration.

As illustrated in FIGS. 2A and 2B, display data is illustrated as M-bit (M being a natural number, for example, M=24) data, and a group of data sequentially received from an external host is provided. In FIG. 2A, since the graphic memory includes the two memory areas GRAM1, GRAM2, odd-numberth data pieces (namely, $1^{st}$ Data, $3^{rd}$ Data, . . . ) are written to a first memory area (for example, the memory area GRAM1), and even-numberth data pieces (namely, $2^{nd}$ Data, $4^{th}$ Data, . . . ) are written to a second memory area (for example, the memory area GRAM2).

A data input clock signal WRX is input for each of a plurality of input data pieces Data[23:0]. Conventionally, data pieces are consecutively written to the graphic memory in response to the data input clock signal WRX so as to be adjacent to each other. However, in exemplary embodiments of the present invention, data pieces are latched during a predetermined period of time, and then written simultaneously when other data pieces are written. For example, in FIG. 2A, when a first data piece (for example, $1^{st}$ Data) is received, the first data piece is not immediately written, and the first data piece is latched until a second data piece (for example, $2^{nd}$ Data) next to the first data piece is received. At this time, the first data piece is latched in response to a latch clock LATCH_CLK.

Next, the second data piece and the latched first data piece are written to the graphic memory at the same time. The first and second data pieces are written to different memory areas GRAM1, GRAM2. In an exemplary embodiment write clock signals WCK1, WCK2 for writing data to the memory areas GRAM1, GRAM2 are substantially the same as each other. When the write clock signals WCK1, WCK2 are compared with the data input clock WRX, it can be seen that the data writing controlling method according to the exemplary embodiment of the present invention can halve the data input speed.

As illustrated in FIG. 2A, the write clock signals WCK1, WCK2 have frequencies obtained by frequency-dividing the data input clock signal WRX by 2. By further lengthening the cycle of a clock signal input to a graphic memory, the graphic memory can have an effect where data and the clock signal are input at lower speeds. In other words, the conventional writing speed of a graphic memory can be increased twofold by doubling the bandwidth of the graphic memory. Similarly, FIG. 2B illustrates a case where the graphic memory included in the driver IC includes the four memory areas GRAM1, GRAM2, GRAM3, GRAM4. Similar to FIG. 2A, a plurality of data pieces are sequentially input in response to the data input clock signal WRX.

A (4n+1)th data piece (n being a natural number) is written to a first memory area (for example, GRAM1), a (4n+2)th data piece is written to a second memory area (for example, GRAM2), a (4n+3)th data piece is written to a third memory area (for example, GRAM3), and a 4n-th data piece is written to a fourth memory area (for example, GRAM4). A first data piece $1^{st}$, a second data piece $2^{nd}$, and a third data piece $3^{rd}$ are latched in response to a latch clock signal LATCH_CLK until a fourth data piece $4^{th}$ is input. The latched first, second, and third data pieces $1^{st}$, $2^{nd}$, and $3^{rd}$ are written to the memory areas GRAM1, GRAM2, GRAM3, respectively, which are separately installed, at the same time when the fourth data piece $4^{th}$ is written to the memory area GRAM4.

In the example of FIG. 2B, since data writing to the graphic memory occurs at every fourth data piece, write clock signals WCK1, WCK2, WCK3, WCK4 of the memory areas GRAM1, GRAM2, GRAM3, GRAM4 have frequencies obtained by frequency-dividing the data input clock signal WRX by 4. Accordingly, in the example of FIG. 2B, the length of a cycle of a clock signal input to the graphic memory can be increased fourfold, and thus an effect where data is input to the graphic memory at a relatively low speed can be obtained. In other words, the speed at which data is written to a graphic memory in the conventional art can be increased four times by increasing the bandwidth of the graphic memory by four times.

As can be determined from FIGS. 2A and 2B, when a graphic memory is divided into N memory areas and data is written thereto according to an exemplary embodiment of the present invention, a data writing speed can be increased by N times. The embodiments of FIGS. 2A and 2B assume that data is written only according to a horizontal writing method. However, in accordance with an exemplary embodiment of the present invention, address signals of input data pieces are mapped so that the input data pieces are written to separate memory areas, and thus not only horizontal data writing but also vertical data writing is possible. Thus, at least one of the horizontal data writing and the vertical data writing is available to write data to the graphic memory.

Accordingly, N graphic memory areas in a horizontal direction and N graphic memory areas in a vertical direction, namely, a total of $N^2$ graphic memory areas, which are separate from each other, are needed to obtain a N-times-increased speed at which data is written to a graphic memory. However, the number of graphic memory areas needed may be reduced by efficiently controlling a data writing method.

Figure 3A:
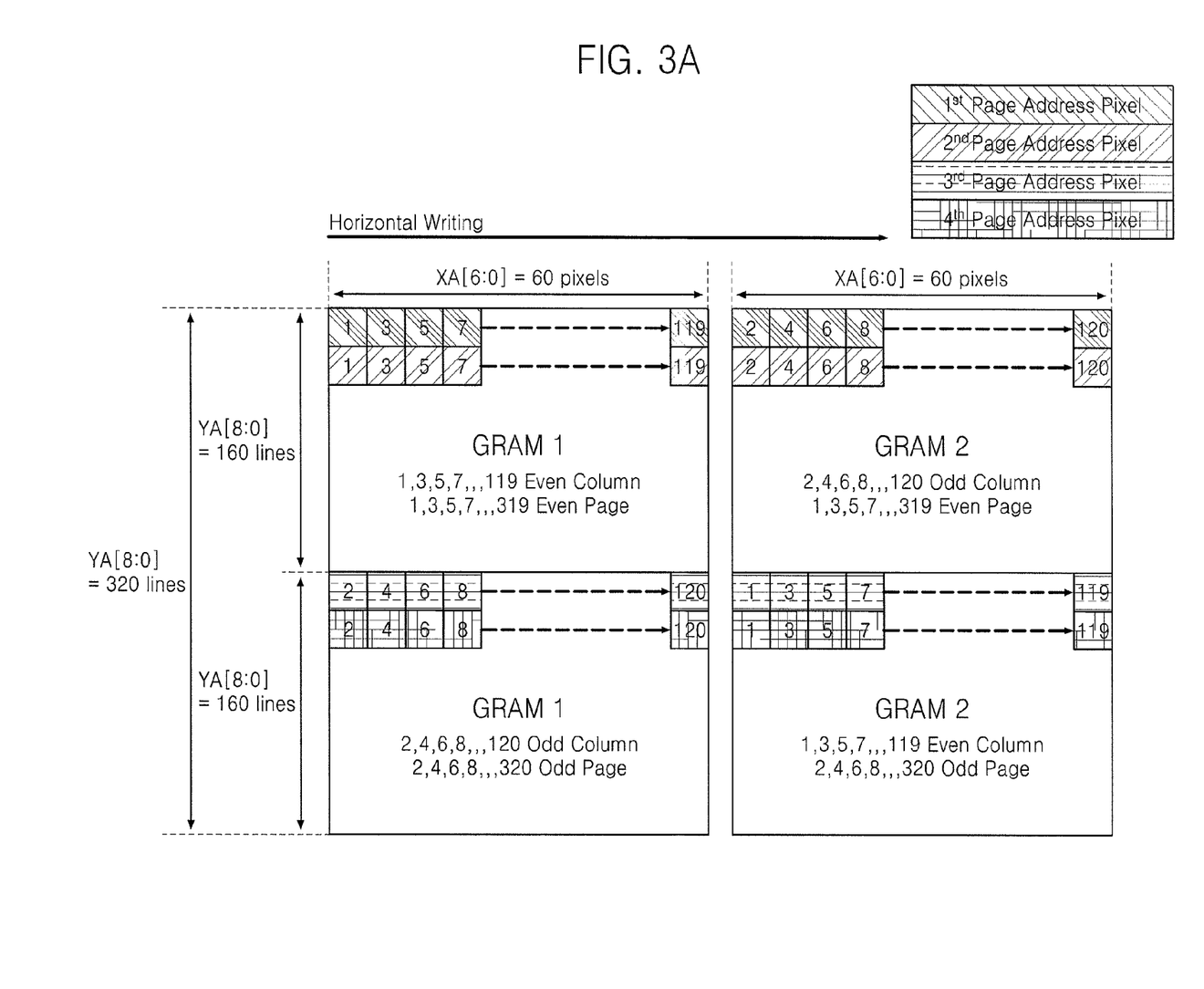
FIG. 3A illustrates a method of writing data to a graphic memory according to an exemplary embodiment of the present invention.
Figure 3B:
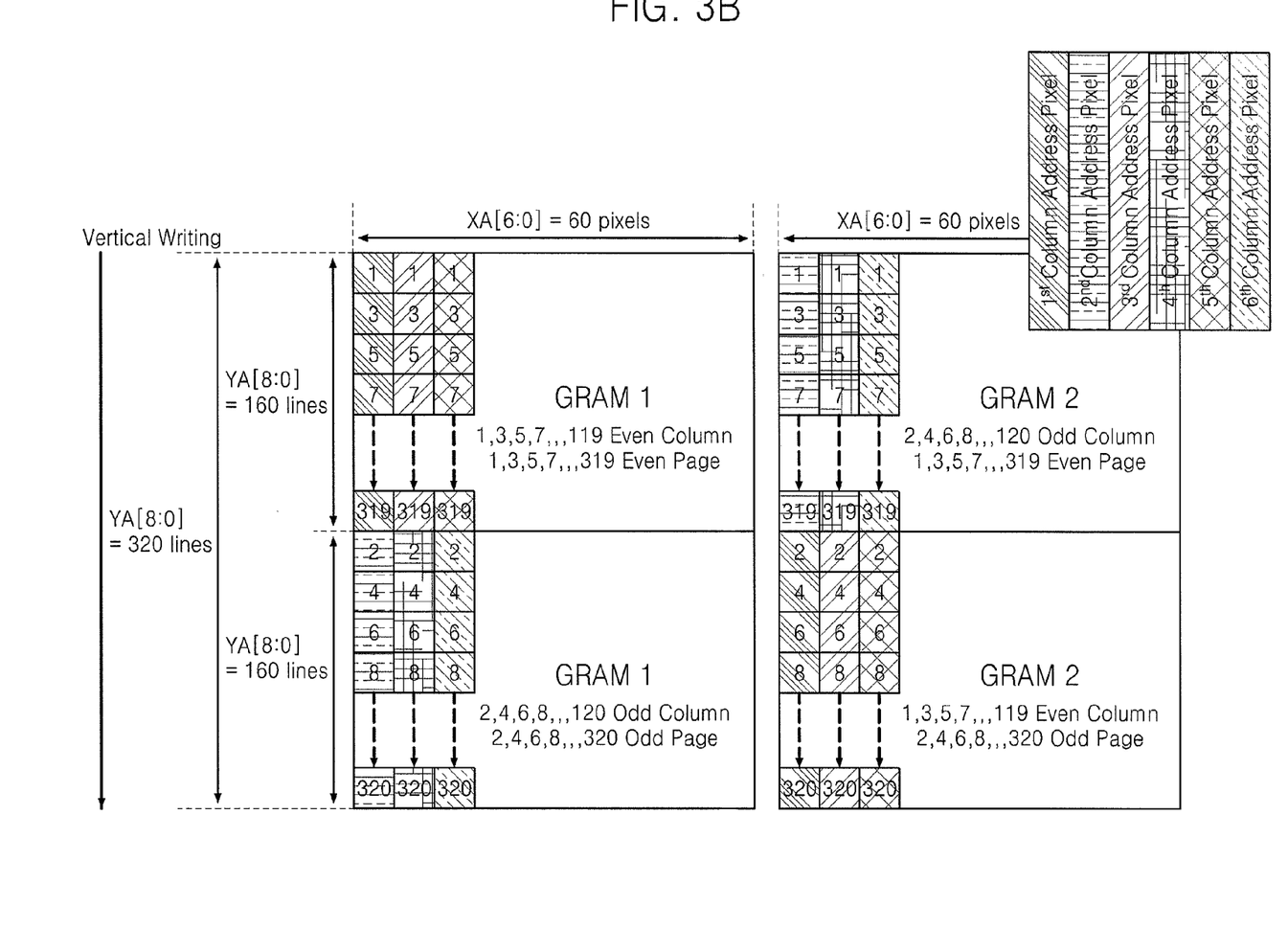
FIG. 3B illustrates a method of writing data to a graphic memory according to the an exemplary embodiment of the present invention.

FIGS. 3A and 3B illustrate exemplary embodiments in which data is written to a graphic memory using methods wherein horizontal data writing and vertical data writing are provided.

To facilitate explanation of the exemplary embodiments of the present invention, formation of images of quarter video graphic array (QVGA) standard is illustrated. However, the embodiments of the present invention are not limited thereto. The QVGA-standard image has a 320×240 size, and the QVGA standard can be used in small display devices. FIGS. 3A and 3B illustrate half of a graphic memory which forms a QVGA-standard image by using four memory areas, each having a 320×60 size.

FIG. 3A illustrates a method of controlling data writing when horizontal (row) writing is used, and FIG. 3B illustrates a method of controlling data writing when vertical (column) writing is used. If a graphic memory includes four memory areas, two memory areas may be disposed on the left side of a control logic and the other two memory areas may be disposed on the right side thereof, when a QVGA-standard driver IC is designed. FIGS. 3A and 3B illustrate only two memory areas GRAM1, GRAM2 which are disposed on one side of the control logic. In FIG. 3A, each of the memory areas GRAM1, GRAM2 has a 320×60 size. Each of the memory areas GRAM1, GRAM2 is divided into an upper and lower subblock.

First page address pixels are written to a first line of an upper subblock of a first memory area (for example, the memory area GRAM1) and a first line of an upper subblock of a second memory area (for example, the memory area GRAM2). More specifically, a first data piece 1 is first latched, and a second data piece 2 and the latched first data piece 1 are simultaneously written to the memory areas GRAM2, GRAM1, respectively, which are separate from each other. In this way, 120 data pieces 1 through 120 that constitute the first page address pixels are written.

Next, second page address pixels are written to a second line of the upper subblock of the first memory area GRAM1 and a second line of the upper subblock of the second memory area GRAM2. In this case, in contrast with the case where the first page address pixels are written, an address signal may be set so that odd-numberth data pieces 1, 3, 5, . . . , through to 119 are written to the second memory area GRAM2 and even-numberth data pieces 2, 4, 6, . . . , through to 120 are written to the first memory area GRAM1.

Third page address pixels are written to a first line of the lower subblock of the first memory area GRAM1 and a first line of the lower subblock of the second memory area GRAM2. Fourth page address pixels are written to a second line of the lower subblock of the first memory area GRAM1 and a second line of the lower subblock of the second memory area GRAM2.

Similar to FIG. 3A, each of the memory areas GRAM1, GRAM2 of FIG. 3B has a 320×60 size. Each of the memory areas GRAM1, GRAM2 is divided into two subblocks. When vertical writing is performed, in order to prevent data pieces from being consecutively written to the same memory area GRAM1, GRAM2, data pieces are simultaneously written to a pair of subblocks existing on a diagonal line (for example, the upper subblock of the first memory area GRAM1 and the lower subblock of the second memory area GRAM2).

For example, first column address pixels are written to a first column of the upper subblock of the first memory area GRAM1 and a first column of the lower subblock of the second memory area GRAM2. More specifically, a first data piece 1 which is first input is latched until a second data piece 2 is input, and the latched first data piece 1 and the input second data piece 2 are simultaneously written to the memory areas GRAM1, GRAM2, respectively, which are separate from each other.

Similarly, second column address pixels are written to a first column of the lower subblock of the first memory area GRAM1 and a first column of the upper subblock of the second memory area GRAM2.

Further, third column address pixels are written to a second column of the upper subblock of the first memory area GRAM1 and a second column of the lower subblock of the second memory area GRAM2. Fourth column address pixels are written to a second column of the lower subblock of the first memory area GRAM1 and a second column of the upper subblock of the second memory area GRAM2. Fifth column address pixels are written to a third column of the upper subblock of the first memory area GRAM1 and a third column of the lower subblock of the second memory area GRAM2. Sixth column address pixels are written to a third column of the lower subblock of the first memory area GRAM1 and a third column of the upper subblock of the second memory area GRAM2.

By using the methods illustrated in FIGS. 3A and 3B, the graphic memory writing speed is increased, and the number of memory areas into which a graphic memory is divided is reduced, by efficiently writing data to the graphic memory.

Figure 4:
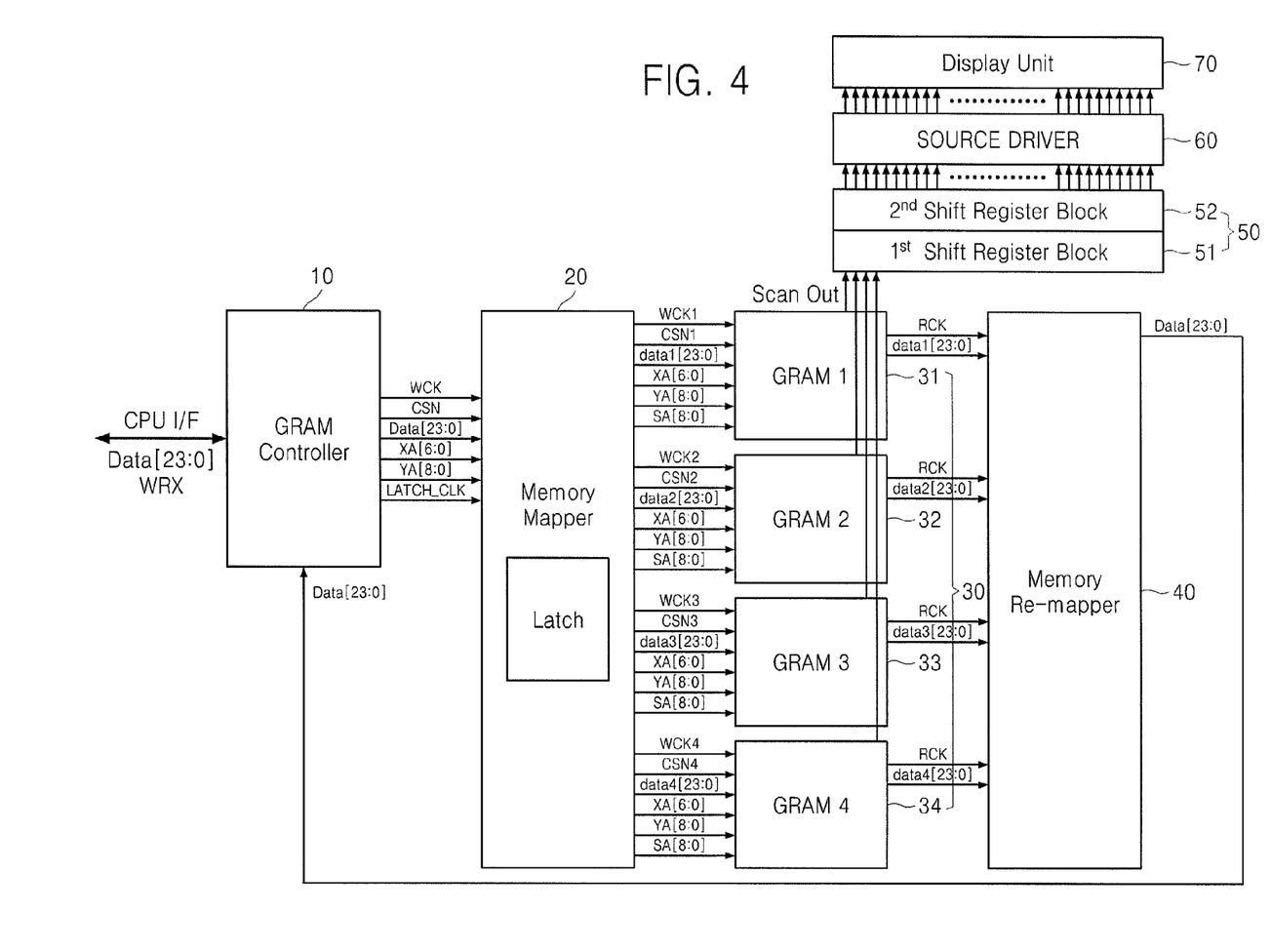
FIG. 4 is a block diagram of an apparatus that performs the method illustrated in FIGS. 2A and 2B.

FIG. 4 is a block diagram of an apparatus that performs the data writing method according to an exemplary embodiment of the present invention. A graphic memory 30 includes four memory areas 31, 32, 33, 34. Data pieces written to the four memory areas 31, 32, 33, 34 are scanned out and transmitted to a source driver 60. The data pieces are read out of the four memory areas 31, 32, 33, 34 in response to a read clock signal RCK. Address signals are remapped and fed back to a graphic memory (GRAM) controller 10.

When display data, a clock signal, etc. are received from an external host, an address signal of each of a plurality of data pieces is mapped by the GRAM controller 10. In a conventional method, a graphic memory controller sequentially writes input data pieces to the same memory so as to be adjacent to each other in the same memory. However, in accordance with exemplary embodiments of the present invention, consecutive data pieces are written to the different memory areas 31, 32, 33, 34, and thus an address signal of display data is mapped differently from the conventional method.

When mapping of the address signals of the data pieces by the GRAM controller 10 is completed, a write clock signal WCK, a chip selection signal CSN, display data Data[23:0], a page address signal XA[6:0], a column address signal YA[8:0], and a latch clock signal LATCH_CLK are transmitted to a memory mapper 20. The write clock signal WCK is obtained by adding a predetermined delay to a data input clock signal WRX received from an external host. Characteristics (for example, frequencies) of the write clock signal WCK and the data input clock signal WRX may be substantially the same as or different from each other. The write clock signal WCK is re-organized into write clock signals WCK1 through WCK4 which are input from the memory mapper 20 to the memory areas 31, 32, 33, 34, respectively.

The chip selection signal CSN is used to select one from the memory areas 31, 32, 33, 34. In the exemplary embodiment of FIG. 4, since the four memory areas 31, 32, 33, 34 are included, the chip selection signal CSN is set to be a 4-bit chip selection signal (for example, CSN[3:0]) and to select a suitable memory area from among the memory areas 31, 32, 33, 34.

The display data Data[23:0], the page address signal XA[6:0], and the column address signal YA[8:0] are also transmitted to the memory mapper 20. The memory mapper 20 transmits chip selection signals CSN1 through CSN4 to the memory areas 31, 32, 33, 34, respectively, and at the same time also transmits display data pieces data1[23:0] through data4[23:0], the write clock signals WCK1 through WCK4, the page address signal XA[6:0], the column address signal YA[8:0], and a scan address signal SA to the memory areas 31, 32, 33, 34.

The memory mapper 20 latches input data pieces in response to the latch clock signal LATCH_CLK. According to an exemplary embodiment of the present invention, the write clock signals WCK1, WCK2, WCK3, WCK4 are input to the memory areas 31, 32, 33, 34, respectively, so that at least one data piece is latched and the latched data piece is written at the same time when other data is written to a corresponding memory area. When data pieces are written to the memory areas 31, 32, 33, 34, respectively, the written data pieces are transmitted to the source driver 60 in order to accomplish a predetermined display screen.

However, since the data pieces that constitute the display screen are not sequentially written to the memory areas 31, 32, 33, 34 but alternately written to the memory areas 31, 32, 33, 34, address signals of the alternately written data pieces are reset to produce a normal display screen. The data pieces scanned out of the memory areas 31, 32, 33, 34 are rearranged by a shift register 50 in units of lines. The shift register 50 includes two shift register blocks, namely, first and second shift register blocks 51, 52. The first shift register block 51 rearranges the data pieces scanned out of the memory areas 31, 32, 33, 34 so that the scanned-out data pieces can be normally displayed. The second shift register block 52 temporarily stores the rearranged data pieces in units of lines and transmits the same to the source driver 60.

The second shift register block 52 may be implemented as a line latch or a line register. The source driver 60 receives the data pieces in units of lines from the second shift register block 52 and transmits the received data pieces to a display unit 70 at high speed so as to form a predetermined display image. In addition, as described above, the data pieces, namely, display data pieces, written to the memory areas 31, 32, 33, 34 are fed back to the GRAM controller 10. To achieve this, the read clock signal RCK is input to a memory re-mapper 40, the data pieces are read out of the memory areas 31, 32, 33, 34 in response to the input read clock signal RCK, and an address signal for the data pieces is remapped and transmitted to the GRAM controller 10.

Figure 5:
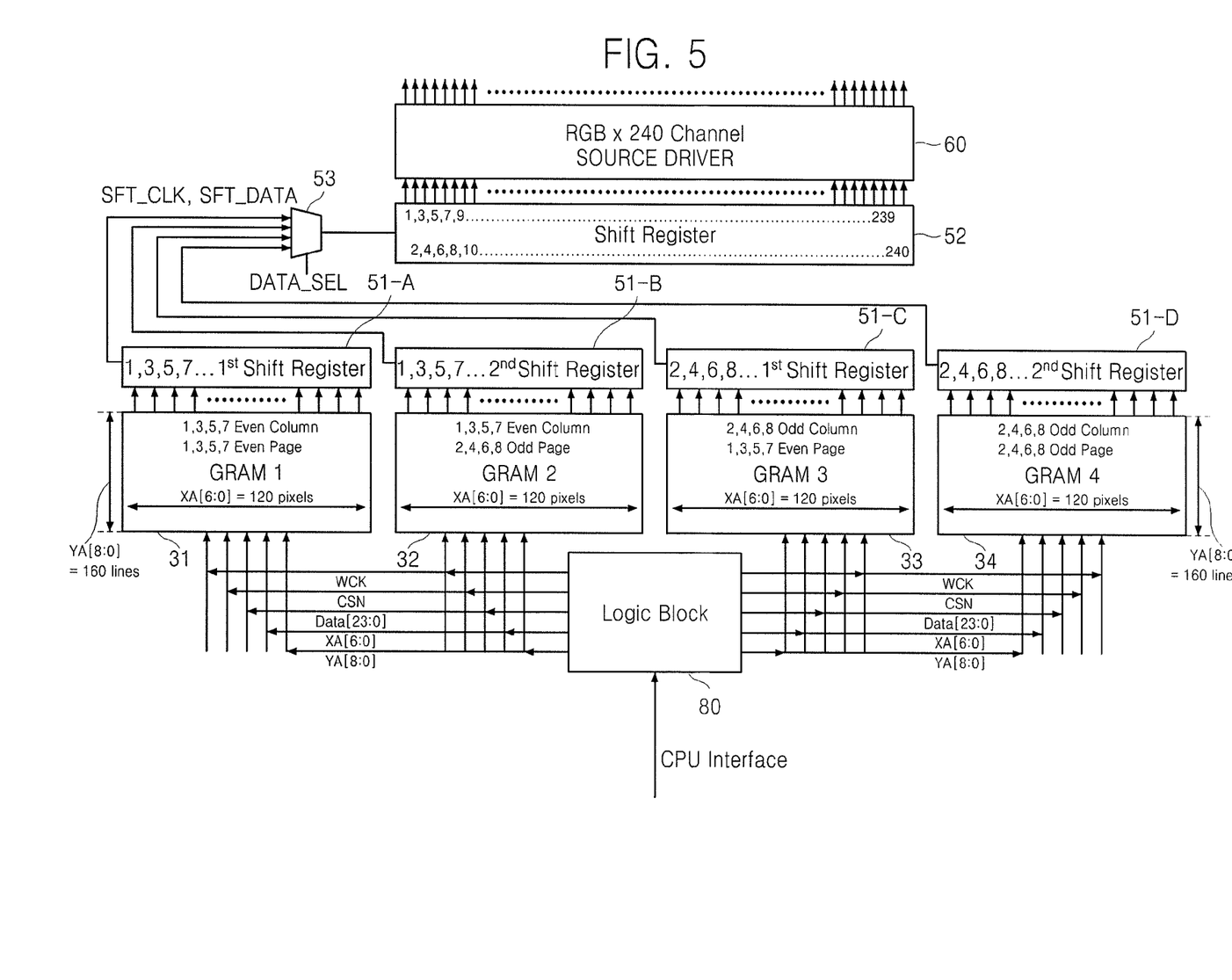
FIG. 5 is a block diagram illustrating the apparatus illustrated in FIG. 4 in greater detail.

FIG. 5 is a block diagram illustrating the apparatus of FIG. 4 in greater detail. FIG. 5 illustrates an exemplary embodiment in which a QVGA-standard IC includes the four memory areas 31, 32, 33, 34, each having a 160×120 size. A logic block 80 designates respective addresses for data pieces, latches predetermined data pieces, and simultaneously writes the latched data pieces and other input data to the memory areas 31, 32, 33, 34. As described above, the logic block 80 transmits the write clock signal WCK, the chip selection signal CSN, the display data Data, the page address signal XA, and the column address signal YA to each of the memory areas 31, 32, 33, 34.

Although FIG. 5 illustrates that odd-numberth pixel data pieces of odd-numberth lines are written to the first memory area 31 (for example, GRAM1), odd-numberth pixel data pieces of even-numberth lines are written to the second memory area 32 (for example, GRAM2), even-numberth pixel data pieces of the odd-numberth lines are written to the third memory area 33 (for example, GRAM3), and even-numberth pixel data pieces of the even-numberth lines are written to the fourth memory area 34 (for example, GRAM4), exemplary embodiments of the present invention are not limited thereto. For example, data pieces stored in a shift register 51-A and data pieces stored in a shift register 51-C may be sequentially shifted one by one and transmitted to a multiplexer (MUX) 53, which alternately selects and outputs the received data pieces.

The second shift register block 52 rearranges the display data so that the display data can form a normal display frame. When a data line is formed, the second shift register block 52 transmits the data line to the source driver 60. As such, the plurality of memory areas 31, 32, 33, 34 are simultaneously accessed for one writing cycle, so that the speed at which data is written to a graphic memory is increased.

Figure 6:
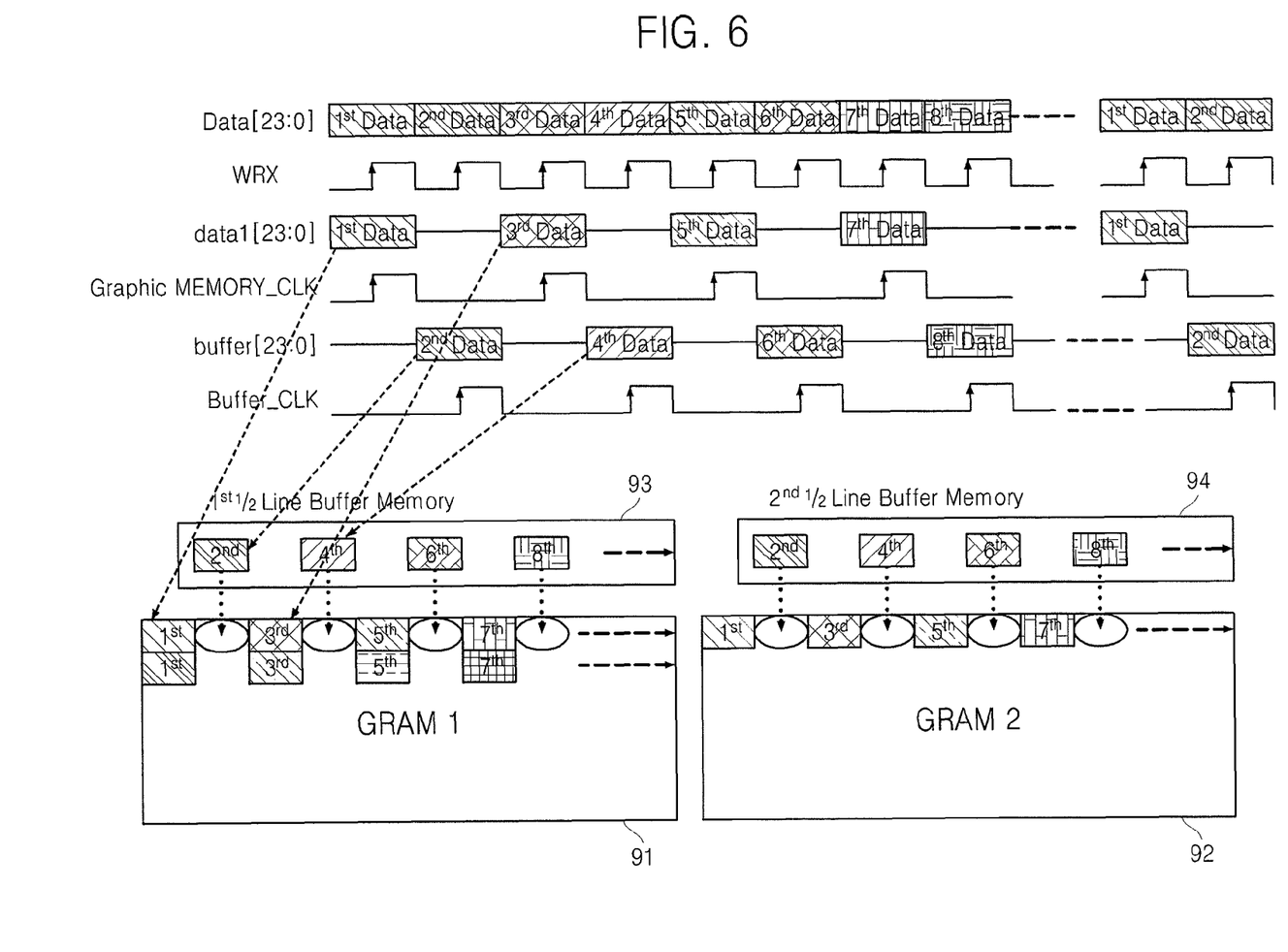
FIG. 6 illustrates a method of controlling the operation of writing data to a graphic memory according to an exemplary embodiment of the present invention.

FIG. 6 illustrates a method of controlling an operation of writing data to a graphic memory, according to an exemplary embodiment of the present invention. In the data writing controlling method, some of the data pieces received from a host are stored in a buffer memory, and at the same time the other received data pieces are written to a graphic memory. When memory access is performed on a next area of the graphic memory, the data pieces stored in the buffer memory are written to an area previous to the next area.

In FIG. 6, the graphic memory includes two memory areas 91, 92. The graphic memory further includes two buffer memories 93, 94 to temporarily store predetermined input data. In the data writing controlling method according to the exemplary embodiment, consecutive data pieces are written consecutively in terms of space but not written consecutively in terms of time, and thus a process of re-setting the address of the graphic memory to which data is written is not needed. Therefore, when data is written to each memory area of the graphic memory, only horizontal writing is performed.

The data writing controlling method according to the exemplary embodiment of FIG. 6, will now be described in greater detail. The data input clock signal WRX is input for each of a plurality of data pieces, but odd-numberth data pieces $1^{st}, 3^{rd}, 5^{th}, \ldots$ are written to the first memory area 91 (for example, GRAM1) in response to a write clock signal Graphic MEMORY_CLK, and even-numberth data pieces $2^{nd}, 4^{th}, 6^{th}, \ldots$ are stored in a first ½-line buffer memory 93 in response to a buffer clock signal Buffer_CLK.

Consequently, only the odd-numberth data pieces $1^{st}, 3^{rd}, 5^{th} \ldots$ are written to a first line of the first memory area 91. In the data write controlling method according to the exemplary embodiment, since only horizontal writing is performed, when data is written to all of odd-numberth storage areas of the first line of the first memory area 91, a first line of the second memory area 92, which is next to the first memory area 91, is accessed. Accordingly, the odd-numberth data pieces $1^{st}, 3^{rd}, 5^{th}, \ldots$ are written to the first line of the second memory area 92, and at the same time the data pieces stored in the first ½-line buffer memory 93 are written to the first memory area 91.

Similarly, when data is written to a second line of the first memory area 91, the data pieces stored in the second ½-line buffer memory 94 are written to the first line of the second memory area 92. In addition, the number of memory areas into which the graphic memory is divided is increased. For example, if the graphic memory includes 4 separate memory areas, (4K+1)th data pieces (K being a natural number) are written to the 4 separate memory areas, and the residual data pieces (for example, (4K+2)th data pieces, (4K+3)th data pieces, and 4K-th data pieces) are stored in a buffer memory. Thereafter, at the same time when the (4K+1)th data pieces are written to a predetermined memory area, the (4K+2)th data pieces, the (4K+3)th data pieces, or the 4K-th data pieces are written to a memory area previous to the predetermined memory area to which the (4K+1)th data pieces are written.

In the data writing controlling method according to the exemplary embodiment, data is written to a predetermined memory area, and at the same time data pieces stored in a buffer memory are written to a memory area previous to the predetermined memory area, so that data pieces that cannot be written to a last memory area (for example, the last three memory areas from among four memory areas) may exist in the buffer memory. In this case, data pieces that cannot be written to a graphic memory and remain in a buffer memory may be written using an internal clock signal of a drive IC. For example, the internal clock signal may be an oscillator clock signal.

Figure 7:
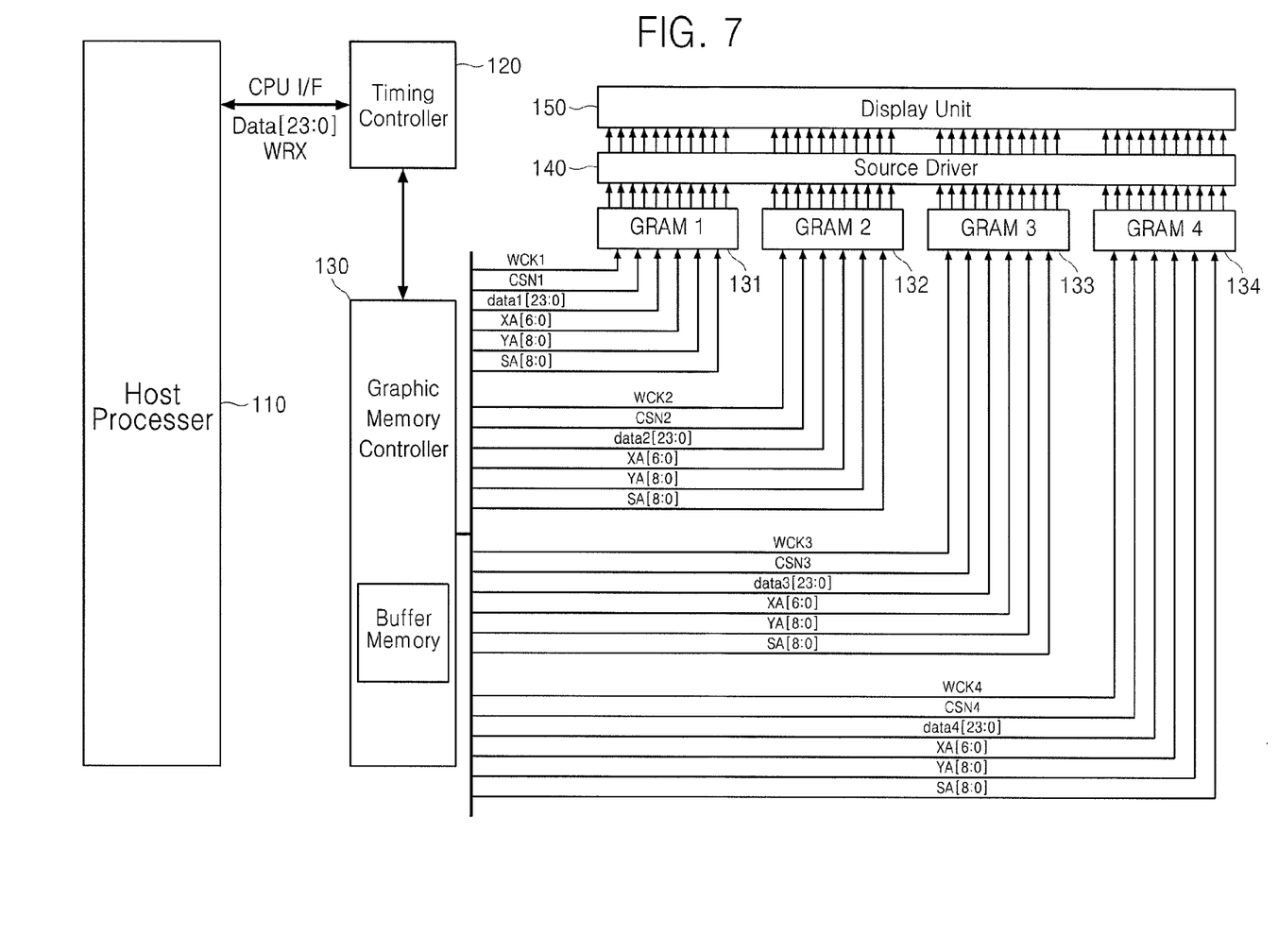
FIG. 7 is a block diagram for explaining the method of FIG. 6.

FIG. 7 is a block diagram for explaining the data writing controlling method according to the exemplary embodiment of FIG. 6. The block diagram of FIG. 7 is similar to that of FIG. 4 except that no shift registers are installed between memory areas 131 through 134 and a source driver 140. In the data writing controlling method, data pieces are consecutively written to predetermined lines of each of the memory areas 131, 132, 133, 134 in a horizontal writing manner, and thus shift registers for rearranging the order of the data pieces are not included.

Data, an enable signal, a clock signal, etc. are transmitted from a host processor 110 to a timing controller 120 via an interface. Since a graphic memory is controlled in units of N-bit (for example, N=24) pixels, the data and the clock signal are appropriately controlled using the timing controller 120. If the clock signal is appropriately controlled from necessity, the clock signal and the like are transmitted to a graphic memory controller 130. The graphic memory controller 130 includes a buffer memory (for example, an SPSRAM). Alternatively, the buffer memory may be installed outside the graphic memory controller 130.

In FIG. 7, a graphic memory is divided into the four memory areas 131, 132, 133, 134, and the write clock signals WCK1, WCK2, WCK3, WCK4, the chip selection signals CSN1, CSN2, CSN3, CSN4, the display data data1 through data4, the page address signal XA, the column address signal YA, and the scan address signal SA are transmitted to each of the four memory areas 131, 132, 133, 134.

The data pieces stored in each of the memory areas 131, 132, 133, 134 are consecutively scanned out and transmitted to the source driver 140. The source driver 140 drives a display unit 150 by using the received data.

In the data writing controlling method according to the exemplary embodiment, a speed of a graphic memory for use in designing currently-used display driver ICs can be increased while the graphic memory is used without changes. In addition, a data writing controlling system can be formed by including only a buffer memory without using high-speed clock signals and shift registers.

Figure 8:
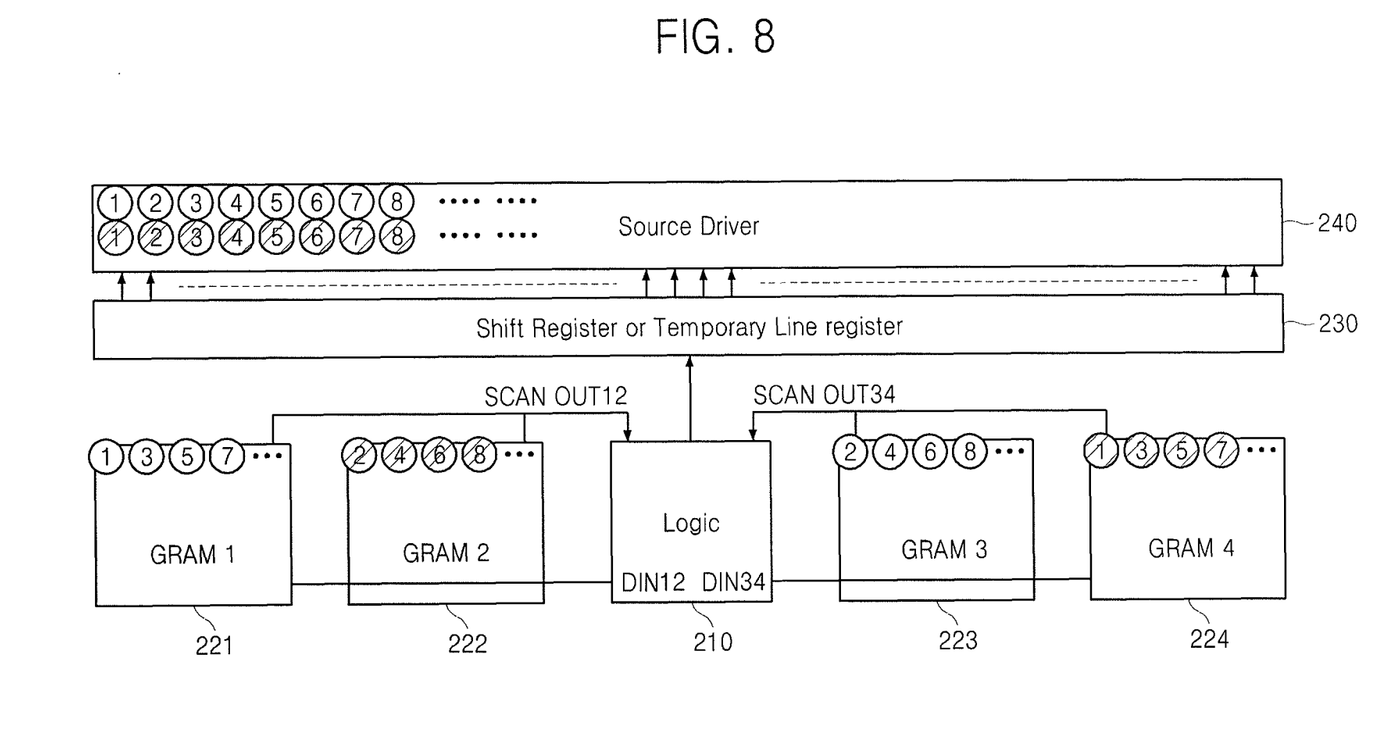
FIG. 8 illustrates a method of controlling the operation of writing data to a graphic memory according to an exemplary embodiment of the present invention.
Figure 9:
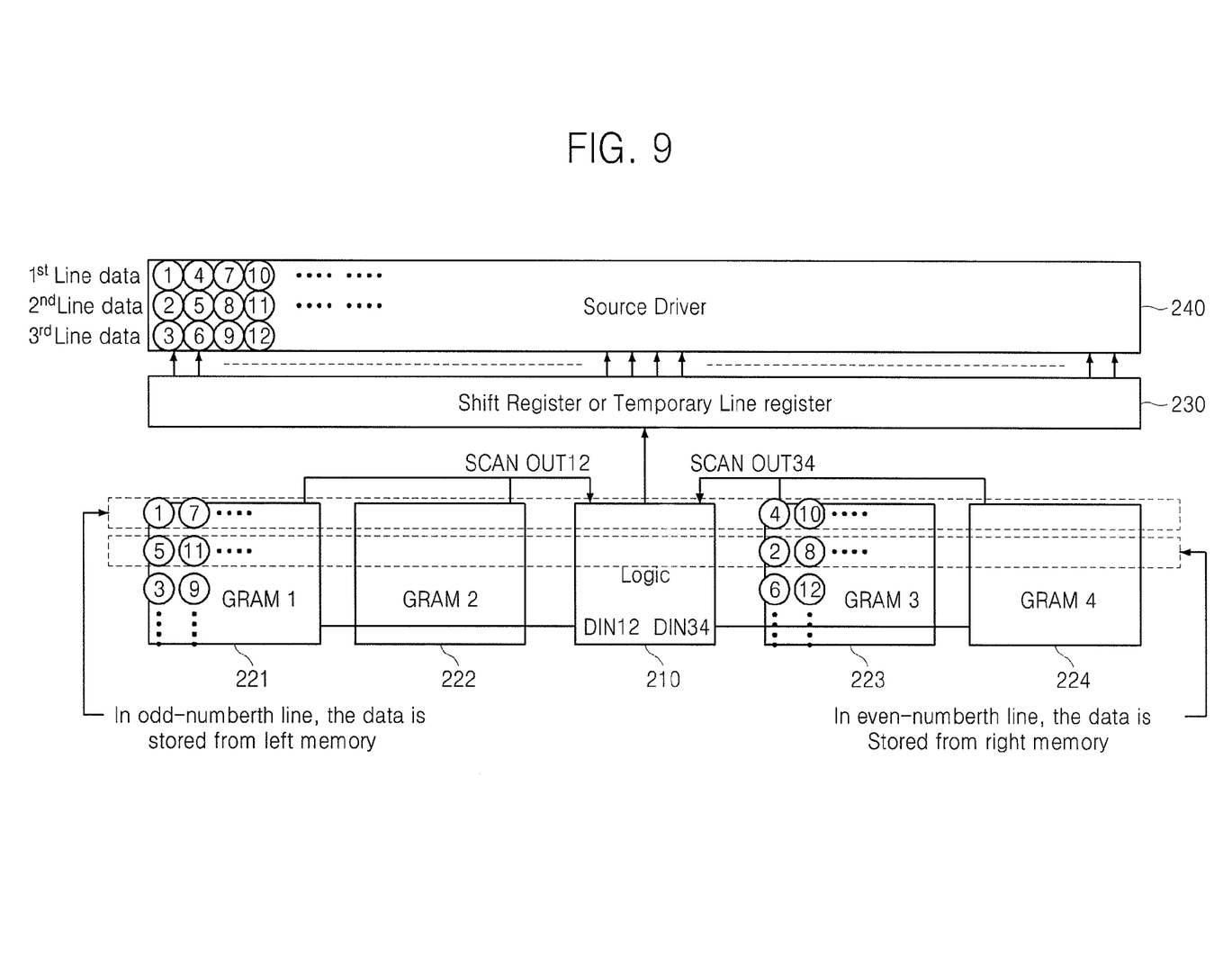
FIG. 9 illustrates a method of controlling the operation of writing data to a graphic memory according to an exemplary embodiment of the present invention.

FIGS. 8 and 9 further illustrate methods of controlling the operation of writing data to a graphic memory, according to exemplary embodiments of the present invention. In the data write controlling methods, data is written every writing clock without latching display data or storing the same in a buffer memory, but consecutive data pieces are written to separate memory areas. Furthermore, a control block is installed between the separate memory areas to which consecutive input data pieces are written.

FIG. 8 illustrates an exemplary embodiment in which the graphic memory includes four memory areas 221, 222, 223, 224 and data is written to the four memory areas 221, 222, 223, 224 by horizontal writing. As illustrated in FIG. 8, data pieces (namely, non-hatched data pieces 1, 2, 3 . . . ) of a first line are alternately written to a first memory area 221 (for example, GRAM1) and to a third memory area 223 (for example, GRAM3). Similarly, data pieces (namely, shaded data pieces 1, 2, 3 . . . ) of a second line are alternately written to a fourth memory area 224 (for example, GRAM4) and a second memory area 222 (for example, GRAM2).

In exemplary embodiments, data may be controlled to be written to the first memory area 221, the third memory area 223, the second memory area 222, and the fourth memory area 224 in this order. When stored data pieces are scanned out of the memory areas 221, 222, 223, 224, the addresses of the data pieces are reset so that normal display can be performed in the data writing order. The address-reset data pieces are transmitted to a source driver 240 via a shift register or temporary line register 230.

FIG. 9 illustrates an exemplary embodiment in which the graphic memory includes the four memory areas 221, 222, 223, 224 and data is written to the four memory areas 221, 222, 223, 224 by vertical writing. As illustrated in FIG. 9, data pieces (namely, 1, 2, 3, . . . ) of a first column are written to the first memory area 221 (for example, GRAM1) and the third memory area 223 (for example, GRAM3). Since vertical writing is performed, when data is written to an N-th column of a memory area, next data is written to an (N+1)th column of another separate memory area.

In the same method as the method of FIG. 8, when stored data pieces are scanned out, the addresses of the data pieces are reset so that normal display can be performed in the data writing order. The address-reset data pieces are transmitted to the source driver 240 via the shift register or temporary line register 230.

In a method and apparatus according to one or more exemplary embodiments of the present invention a writing speed can be increased by efficiently writing data. In addition, since a graphic memory used in a conventional display drive IC can be used without changes, additional costs are not incurred. Moreover, the conventional display drive IC can be used without changes, and only the data writing method is controlled, so that a display drive IC can be easily implemented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling an operation of writing data to a graphic memory having a first memory area separated from a second memory area, the method comprising:
latching first input data in response to a first clock signal; and
writing the first input data to the first memory area in response to a second clock signal while simultaneously writing second input data received after the first input data to the second memory area,
wherein the graphic memory is included in a display driver integrated circuit,
wherein the first input data and the second input data are from a same column of input data stream,
wherein the first memory area is apportioned into a first memory upper subblock having upper columns and a first memory lower subblock having lower columns, and the second memory area is apportioned into a second memory upper subblock having upper columns and a second memory lower subblock having lower columns, and
wherein the first input data is written to an upper column of the first memory area and simultaneously the second input data is written to a lower column of the second memory area.

2. The method of claim 1, wherein a cycle of the first clock signal is the same as or shorter than a cycle of the second clock signal.

3. The method of claim 1, wherein the first input data is odd-numberth input data and the second input data is even-numberth input data.

4. The method of claim 1, further comprising:
writing first column data to a first column of the first memory upper subblock and to a first column of the second memory lower subblock;
writing second column data to a first column of the first memory lower subblock and to a first column of the second memory upper subblock;
writing third column data to a second column of the first memory upper subblock and to a second column of the second memory lower subblock; and
writing fourth column data to a second column of the first memory lower subblock and to a second column of the second memory upper subblock.

5. The method of claim 4, wherein each column data includes odd-numberth input data and even-numberth input data, the odd-numberth input data being written to columns of the first memory upper subblock and to columns of the second memory upper subblock, the even-numberth input data being written to columns of the first memory lower subblock and to columns of the second memory lower subblock.

6. The method of claim 4, wherein each of the column data comprises quarter video graphic array standard image data.

7. An apparatus for controlling an operation of writing data to a graphic memory that has a plurality of memory areas separate from each other, the apparatus comprising:
a controller that controls a plurality of consecutive input data such that each data input of the consecutive data is not consecutively written to the same memory area in terms of time or space,
wherein the graphic memory is included in a display driver integrated circuit,
wherein the consecutive input data are from a same column of input data stream,
wherein the memory areas comprise:
a first memory area apportioned into a first memory upper subblock having upper columns and a first memory lower subblock having lower columns, and
a second memory area apportioned into a second memory upper subblock having upper columns and a second memory lower subblock having lower columns, and
wherein first input data of the consecutive input data is written to an upper column of the first memory area and simultaneously the second input data of the consecutive input data is written to a lower column of the second memory area.

8. The apparatus of claim 7, further comprising a latch unit that latches at least one of the plurality of consecutive input data.

9. The apparatus of claim 8, wherein the controller controls the data latched by the latch unit and another data from the plurality of consecutively input data to be simultaneously written to the separate memory areas, respectively.

10. The apparatus of claim 7, further comprising a buffer memory that temporarily stores at least one of the plurality of consecutive input data.

11. The apparatus of claim 10, wherein the controller controls the data temporarily stored in the buffer memory and another data from the plurality of consecutively input data to be simultaneously written to the separate memory areas, respectively.

12. The apparatus of claim 7, wherein the controller is disposed between the separate memory areas.

* * * * *